(12) United States Patent
Aramaki et al.

(10) Patent No.: US 6,936,682 B2
(45) Date of Patent: Aug. 30, 2005

(54) POLYAMIDE

(75) Inventors: Masaaki Aramaki, Sodegaura (JP);
Tomofumi Maekawa, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 56 days.

(21) Appl. No.: 10/450,052

(22) PCT Filed: Dec. 6, 2001

(86) PCT No.: PCT/JP01/10693

§ 371 (c)(1),
(2), (4) Date: Jun. 10, 2003

(87) PCT Pub. No.: WO02/48239

PCT Pub. Date: Jun. 20, 2002

(65) Prior Publication Data
US 2004/0049006 A1 Mar. 11, 2004

(30) Foreign Application Priority Data

Dec. 11, 2000 (JP) ........................ 2000-375878

(51) Int. Cl.$^7$ .............................................. C08G 69/26
(52) U.S. Cl. ....................... 528/310; 528/335; 528/339; 528/344; 528/346; 528/347; 524/606
(58) Field of Search ................................. 528/310, 344, 528/347, 346, 335, 339, 348; 524/606

(56) References Cited

U.S. PATENT DOCUMENTS

| | | | | |
|---|---|---|---|---|
| 3,839,299 A | * | 10/1974 | Campbell et al. | 528/339 |
| 4,205,159 A | * | 5/1980 | Meyer et al. | 528/338 |
| 4,255,560 A | * | 3/1981 | Meyer et al. | 528/339 |
| 4,264,762 A | * | 4/1981 | Cordes et al. | 528/338 |
| 4,369,305 A | * | 1/1983 | Pagilagan | 528/338 |
| 4,471,088 A | * | 9/1984 | Chiba et al. | 524/606 |
| 5,166,312 A | * | 11/1992 | Wenzel et al. | 528/340 |
| 5,360,891 A | * | 11/1994 | Wenzel et al. | 528/335 |
| 5,696,202 A | * | 12/1997 | Torre | 524/606 |
| 5,773,558 A | * | 6/1998 | Torre | 528/335 |
| 5,965,689 A | * | 10/1999 | Koning et al. | 528/310 |
| 6,008,288 A | * | 12/1999 | Dalla Torre | 524/538 |
| 6,172,178 B1 | * | 1/2001 | Koning et al. | 528/310 |
| 6,277,911 B1 | * | 8/2001 | Torre | 524/606 |

FOREIGN PATENT DOCUMENTS

| | | |
|---|---|---|
| JP | 47-11073 B | 4/1972 |
| JP | 48-72299 A | 9/1973 |
| JP | 51-74704 A | 6/1976 |
| JP | 58-2327 A | 1/1983 |
| JP | 58-198439 A | 11/1993 |
| JP | 9-12868 A | 1/1997 |
| JP | 11-512476 A | 10/1999 |

OTHER PUBLICATIONS

Research Disclosure, Jun. 1991, pp. 405–417, No. 326.
Vanhaecht, Bert et al, Journal of Polymer Science, Polymer Chemistry, Jan. 2001, pp. 833–840, vol. 39, No. 6, part A.

\* cited by examiner

*Primary Examiner*—P. Hampton Hightower
(74) *Attorney, Agent, or Firm*—Birch, Stewart, Kolasch & Birch, LLP

(57) ABSTRACT

A polyamide characterized in that the polyamide is obtained by thermal polycondensation of (a) dicarboxylic acid components comprising 10 to 80% by mole in total carboxylic acid components of 1,4-cyclohexanedicarboxylic acid having a trans/cis molar ratio of 50/50 to 97/3 and (b) an aliphatic diamine component is disclosed. The alicyclic polyamide having 1,4-cyclohexanedicarboxylic acid in a backbone thereof as a dicarboxylic acid unit, which is suitable as materials for various uses such as automotive parts, electric/electronics parts, industrial materials, engineering materials and daily household goods, and superior in heat resistance, low water absorption, light resistance, moldability and light weight, as well as superior in toughness, chemical resistance and appearance, and molded articles thereof.

18 Claims, No Drawings

POLYAMIDE

This application is the national phase under 35 U.S.C. §371 of PCT International Application No. PCT/JP01/10693 which has an International filing date of Dec. 6, 2001, which designated the United States of America.

TECHNICAL FIELD

The present invention relates to a new polyamide and molded articles thereof. In more detail, the present invention relates to a new polyamide superior in moldability, heat resistance, light resistance and weather resistance, as well as superior in toughness, low water absorption, chemical resistance and appearance. The inventive polyamide is also suitable as materials for various uses such as automotive parts, electric/electronics parts, industrial materials, engineering materials and daily household goods, and molded articles thereof.

PRIOR ART

Polyamides, represented by nylon 6 and nylon 66, have been widely used as materials for various uses such as clothing, industrial materials, automotive parts, electric/electronics parts and engineering parts, due to superior moldability, mechanical properties and chemical resistance.

However, with the recent demand for weight reduction of parts, a substitute for metals used in the parts is molded polyamide. As such, the mechanical properties required for molded articles of polyamide have been on the increase. More specifically, conventional nylon 6 and nylon 66 are not satisfactory in heat resistance, dimensional stability, mechanical properties and chemical resistance and thus cannot be used at present, for example, in an electric/electronics application where a heat resistance for reflow soldering is required along with a development of surface mounting technology (SMT), or an application for under-hood automotive parts where the requirements have been raised year after year.

A polyamide with a high melting point has been proposed to respond to these demands by solving the problems of the conventional polyamides. More specifically, for example, an aliphatic polyamide with a high melting point composed of adipic acid and 1,4-butanediamine (which may be abbreviated as PA46 hereinafter) and a semi-aromatic polyamide with a high melting point mainly composed of terephthalic acid and 1,6-hexanediamine (which may be abbreviated as 6T type copolyamide hereinafter) have been proposed and some of which are practically used.

However, although PA46 has good moldability and heat resistance, it has problems of remarkably large dimensional change and lowering in mechanical properties caused by water absorption. A polyamide composed of terephthalic acid and 1,6-hexanediamine (which may be abbreviated as PA6T type hereinafter) also has a such high melting point as about 370° C., but it is difficult to obtain molded articles with satisfactory properties by melt molding due to vigorous thermal degradation of the polymer itself. Therefore, a 6T type copolyamide having a lowered melting point in a range of 220 to 340° C. has been developed and used by copolymerizing PA6T with an aliphatic polyamide such as nylon 6 and nylon 66 or an amorphous aromatic polyamide such as nylon 6I. Said 6T type copolyamide really has low water absorption, high heat resistance and high chemical resistance, but has disadvantages such as inferior moldabilty, toughness and light resistance. Said copolyamide also has a high specific gravity, resulting in a problem in weight reduction.

Furthermore, an alicyclic polyamide with a high melting point composed of 1,4-cyclohexanedicarboxylic acid and 1,6-hexanediamine (which may be abbreviated as PA6C hereinafter) or a semi-alicyclic polyamide composed of said alicyclic polyamide and other nylon has been proposed. More specifically, for example, JP-B-47-11073 discloses improvements in heat resistance and mechanical properties by introducing a benzene ring or a cyclohexane ring into the molecular chain of the polyamide. JP-A-58-198439 discloses a polyamide composed of 1,4-cyclohexanedicarboxylic acid, having a trans/cis ratio of 20/80 to 50/50, and undecanonanediamine. RESEARCH DISCLOSURE, P. 405–417 (1991) discloses a polyamide composed of 1,4-cyclohexanedicarboxylic acid having a trans ratio of not less than 99% and/or isophthalic acid as a carboxylic acid component, and an aliphatic diamine having carbon atoms of 6 to 9 as a diamine component. A polyamide composed of 1,4-cyclohexanedicarboxylic acid having a trans ratio of not less than 99% and adipic acid, as a carboxylic acid component, and hexamethylenediamine, as a diamine component, has been also disclosed. Further, JP-A-11-512476 discloses that a semi-alicyclic polyamide composed of 1 to 40% of 1,4-cyclohexanedicarboxylic acid, as a carboxylic acid unit, shows an improved heat resistance for soldering. JP-A-9-12868 further discloses that a polyamide composed of a dicarboxylic acid unit, in which 1,4-cyclohexanedicarboxylic acid ranges 85 to 100% by mole thereof, and an aliphatic diamine as a diamine unit is superior in light resistance, toughness, moldability and heat resistance.

According to the study by the present inventors, an alicyclic polyamide with a high melting point composed of 1,4-cyclohexanedicarboxylic acid and 1,6-hexanediamine or a semi-alicyclic polyamide, which is a copolymer of said alicyclic polyamide and other nylon, really has, to a certain extent, more improved moldability, heat resistance and light resistance compared with those of the conventional nylon 6, nylon 66, the aliphatic polyamide having a high melting point or the semi-aromatic polyamide, but still needs improvement and is insufficient in such characteristics as toughness, dimensional stability in water absorption, chemical resistance and appearance, thus its application is limited at the moment.

DISCLOSURE OF THE INVENTION

An object of the present invention is to provide an alicyclic polyamide having 1,4-cyclohexanedicarboxylic acid as a carboxylic acid unit in a backbone thereof, and superior in moldability, heat resistance, light resistance and weather resistance, as well as superior in toughness, low water absorption, chemical resistance and appearance suitable as materials for various uses such as automotive parts, electric/electronics parts, industrial materials, engineering materials and daily household goods, and molded articles thereof.

The present inventors, after an extensive study to solve the above-described problems, found that the problems described above were able to be solved by a new alicyclic polyamide obtained by polycondensation of dicarboxylic acid components containing 1,4-cyclohexanedicarboxylic acid having a specified trans/cis molar ratio and a diamine component. In particular, the present inventors found that a semi-alicyclic polyamide, which was a copolymerized polyamide of said alicyclic polyamide with other types of nylon, was able to effect remarkable improvements, and thus accomplished the present invention.

Thus, the present invention relates to a polyamide obtained by thermal polycondensation of (a) dicarboxylic acid components comprising 10 to 80% by mole based on the total carboxylic acid components of 1,4-cyclohexanedicarboxylic acid having a specified trans/cis molar ratio, and (b) an aliphatic diamine component, and preferably a polyamide wherein a dicarboxylic acid component other than 1,4-cyclohexanedicarboxylic acid is an aliphatic dicarboxylic acid having 6 to 12 carbon atoms and/or an aromatic dicarboxylic acid and an aliphatic diamine component having 4 to 12 carbon atoms.

BEST MODE FOR CARRYING OUT THE INVENTION

The present invention relates to a polyamide obtained by thermal polycondensation of dicarboxylic acid components containing 1,4-cyclohexanedicarboxylic acid having a specified trans/cis molar ratio and a diamine component.

The polyamide of the present invention is a polymer having amide bonds (—NHCO—) in a main chain thereof. 1,4-Cyclohexanedicarboxylic acid used in the present invention has a trans/cis molar ratio of 50/50 to 97/3, preferably 50/50 to 90/10, more preferably 55/45 to 90/10 and most preferably 70/30 to 90/10. The trans/cis molar ratio of 1,4-cyclohexanedicarboxylic acid can be determined by using 1,4-cyclohexanedicarboxylic acid as a raw material of the polyamide by high performance liquid chromatography (HPLC). More specifically, it can be determined by separating 1,4-cyclohexanedicarboxylic acid into trans and cis components by a gradient elution method using a reversed-phase column to determine each peak area. In more detail, the polyamide is hydrolyzed with an acid such as hydrobromic acid (HBr), followed by trimethylsilylation (TMS treatment) and gas chromatography measurement to separate into trans and cis components and determine each peak area. A trans/cis molar ratio of 1,4-cyclohexanedicarboxylic acid lower than the above-described 50/50 tends to lower toughness and chemical resistance of the obtained polyamide. Also, a ratio higher than 97/3 tends to deteriorate the appearance of molded articles thereof.

The dicarboxylic acid component other than 1,4-cyclohexanedicarboxylic acid unit preferably used in the present invention includes, for example, an aliphatic dicarboxylic acid such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid, dodecanedicarboxylic acid and eicodionic acid; alicyclic dicarboxylic acid such as 1,3-cyclopentanedicarboxylic acid and 1,3-cyclohexanedicarboxylic acid; and aromatic dicarboxylic acid such as terephthalic acid, isophthalic acid, naphthalenedicarboxylic acid, 2-chloroterephthalic acid, 2-methylterephthalic acid, 5-methylisophthalic acid, 5-sodiumsulfoisophthalic acid, hexahydroterephthalic acid and diglycolic acid. In the present invention, these dicarboxylic acid components other than 1,4-cyclohexanedicarboxylic acid may be used alone or in combination of two or more types thereof. Further, a polyvalent carboxylic acid having three or more valences, such as trimellitic acid, trimesic acid and pyromellitic acid may be included within a range, which does not deteriorate the object of the present invention. Among these dicarboxylic acids, an aliphatic dicarboxylic acid having carbon atoms of 6 to 12 and/or an aromatic dicarboxylic acid is preferable, and use of adipic acid and/or isophthalic acid is particularly preferable.

The concentration of 1,4-cyclohexanedicarboxylic acid in the present invention is 10 to 80% by mole, preferably 10 to 70% by mole and most preferably 10 to 60% by mole based on the total dicarboxylic acid components. Among others, a preferable combination of dicarboxylic acid components is 10 to 60% by mole of 1,4-cyclohexanedicarboxylic acid, 20 to 90% by mole of adipic acid and 0 to 40% by mole of isophthalic acid, wherein the total of 1,4-cyclohexanedicarboxylic acid, adipic acid and isophthalic acid is 100% by mole. The content of each dicarboxylic acid in the polyamide can be determined for example, by gas chromatography (GC). More specifically, the content can be determined by hydrolyzing the polyamide with an acid such as hydrobromic acid (HBr), followed by trimethylsilylation (TMS treatment) and gas chromatography measurement to determine a peak area derived from each component. A content of 1,4-cyclohexanedicarboxylic acid in the total dicarboxylic acid components less than 10% by mole tends to lower heat resistance, chemical resistance, light resistance and weather resistance, whereas a content over 60% by mole tends to deteriorate appearance of molded articles thereof.

An aliphatic diamine components preferably used in the present invention includes, for example, aliphatic diamines such as ethylenediamine, propylenediamine, tetramethylenediamine, heptamethylenediamine, hexamethylenediamine, pentamethylenediamine, octamethylenediamine, nonamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, and 5-methylnonanediamine. These aliphatic diamine components may be used alone or in combination of two or more types thereof. Furthermore, a polyvalent aliphatic diamine component having three or more valences such as bishexamethylenetriamine may be included within a range, which does not deteriorate the object of the present invention. Among these aliphatic diamine components, an aliphatic diamine having carbon atoms of 4 to 12 is preferably used and use of an aliphatic diamine having carbon atoms of 6 to 8 is more preferable, in particular, use of hexamethylenediamine is most preferable.

In the present invention, besides the above-described 1,4-cyclohexanedicarboxylic acid and/or dicarboxylic acid components other than 1,4-cyclohexanedicarboxylic acid and diamine components, any polycondensable amino acid and lactam may be used as a copolymerization component.

The amino acid includes, for example, 6-aminocaproic acid, 11-aminoundecanoic acid, 12-aminododecanoic acid and p-aminomethylbenzoic acid. In the present invention, these amino acids may be used alone or in combination of two or more types thereof.

The lactam includes, for example, butyrolactam, pivalolactam, caprolactam, capryllactam, enantolactam, undecanolactam and dodecanolactam. In the present invention, these lactams may be used alone or in combination of two or more types thereof.

In the present invention, a known end capping agent may be added to control molecular weight or improve hot water resistance. As the end capping agent, a monocarboxylic acid or a monoamine is preferable. Furthermore, an acid anhydride such as phthalic anhydride; monoisocyanate; monohalogenated compound; monoesters; and monoalcohols are included.

As the monocarboxylic acid which can be used as the end capping agent, any monocarboxylic acid can be used without specific limitation as long as it has reactivity with an amino group, and the monocarboxylic acid includes, for example, aliphatic monocarboxylic acid such as acetic acid, propionic acid, butyric acid, valeric acid, caproic acid, caprylic acid, lauric acid, tridecylic acid, myristic acid, palmitic acid, stearic acid, pivalic acid and isobutyric acid; alicyclic monocarboxylic acid such as cyclohexanecarboxylic acid; and aromatic monocarboxylic acid such as benzoic acid, toluic acid, α-naphthalene carboxylic acid, β-naphthalene carboxylic acid, methylnaphthalene carboxylic acid and phenylacetic acid. In the present invention, these monocarboxylic acids may be used alone or in combination of two or more types thereof.

As the monoamine which is used as the end capping agent, any monoamine can be used without specific limitation as long as it has reactivity with a carboxyl group, and the monoamine includes, for example, aliphatic monoamine such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; and aromatic monoamines such as aniline, toluidine, diphenylamine and naphthylamine. In the present invention, these monoamines may be used alone or in combination of two or more types thereof.

As a method of thermal polycondensation of the polyamide used in the present invention, known methods can be used, and a method of thermal polycondensation under the condition at a temperature of preferably not lower than 100° C., more preferably not lower than 120° C. and most preferably not lower than 170° C. is used. For example, such a method of thermal melt-polycondensation can be used, where a mixture, a solid salt or an aqueous solution of dicarboxylic acid and diamine such as 1,4-cyclohexanedicarboxylic acid and hexamethyleneadipamide is concentrated by heating at a temperature of 100 to 300° C., while a steam pressure generated is maintained between the normal pressure to about 5 MPa (in gauge pressure), followed by depressurization at a final stage to conduct polycondensation under the normal pressure or a reduced pressure. Furthermore, solid phase polymerization method can also be used, where a mixture, a solid salt or a polycondensate of dicarboxylic acid and diamine is subjected to thermal polycondensation at a temperature of not higher than the melting point thereof. These methods may be combined if necessary.

As a polymerization system, batch system or continuous system may be used. In addition, there is no limitation in polymerization equipment and known equipment such as an autoclave type reactor, a tumbler type reactor and an extruder type reactor including a kneader can be used.

Among others, a preferable thermal polycondensation method for obtaining the polyamide of the present invention is as follows. A mixture, a solid salt or an aqueous solution of dicarboxylic acid and diamine is produced, added thereto with a catalyst or an end capping agent if necessary, then subjected to thermal polycondensation method at 100 to 320° C. to obtain a prepolymer with a number average molecular weight (Mn) of 1,000 to 7,000. The prepolymer is then polymerized in solid phase using a tumbler type reactor or subjected to polycondensation in molten state under a reduced pressure using an extruder type reactor such as a kneader to obtain the polyamide with a number average molecular weight (Mn) of 7,000 to 100,000.

When an extruder type reactor such as a kneader is used, an extrusion condition under a reduced pressure of 0 to 0.07 MPa is preferable. An extrusion temperature is preferably a temperature of about 1 to 100° C. above the melting point determined by a measurement with differential scanning calorimetry (DSC) in accordance with JIS K7121. A shear rate is preferably not lower than about 100 (sec$^{-1}$) and an average residence time is preferably about 1 to 15 minutes. Within the above-described ranges, problems such as coloring and failing to achieve a high molecular weight scarcely occur.

The above-described catalyst is not specifically limited as long as it is known type to be used for polyamide, and includes, for example, phosphoric acid, phosphorous acid, hypophosphorous acid, orthophosphorous acid, pyrophosphorous acid, phenylphosphinic acid, phenylphosphonic acid, 2-methoxyphenylphosphonic acid, 2-(2'-pyridil)ethylphosphonic acid and metal salts thereof. The metal salts includes salts of pottassium, sodium, magnesium, vanadium, calcium, zinc, cobalt, manganese, tin, tungsten, germanium, titanium and antimony, and ammonium salts can also be used. Further, phosphorates such as ethyl ester, isopropyl ester, butyl ester, hexyl ester, decyl ester, isodecyl ester, octadecyl ester, stearyl ester and phenyl ester can also be used.

The molecular weight of the polyamide of the present invention is preferably 7,000 to 100,000, more preferably 7,500 to 50,000 and most preferably 10,000 to 40,000 in number average molecular weight (Mn) from the viewpoint of superior moldability and physical properties. The number average molecular weight (Mn) can be determined by gel permeation chromatography (GPC) using hexafluoroisopropanol as a solvent and poly(methyl methacrylate) (PMMA) as a standard sample of molecular weight. A polyamide having a number average molecular weight (Mn) of not lower than 7,000 tends to suppress lowering in toughness, and a polyamide having Mn not higher than 100,000 tends to suppress lowering in moldability.

Furthermore, the polyamide of the present invention has a molecular weight distribution (Mw/Mn), which is a ratio of weight average molecular weight (Mw) and number average molecular weight (Mn) determined by the above-described GPC, in a range of preferably 2 to 6, more preferably 2.5 to 5 and most preferably 3 to 4. The molecular weight distribution (Mw/Mn) not less than 2 provides reduced lowering in chemical resistance and the like, while Mw/Mn not higher than 6 provides reduced lowering in moldability and the like.

Melting point of the polyamide of the present invention is preferably 210 to 340° C., more preferably 230 to 330° C., further more preferably 250 to 320° C. and most preferably 260 to 300° C. The melting point can be measured in accordance with JIS K7121. More specifically, it can be determined using, for example, DSC-7 equipment made by PERKIN-ELMER INC. as follows. A 8 mg sample is heated up to 400° C. at a heating rate of 20° C./min, and a peak temperature in the melting curve thus obtained is defined as the melting point. When the melting point is not lower than 210° C., there is no tendency for lowering the chemical and heat resistance of the polyamide, while having a melting point not higher than 340° C. provides less possibility of thermal degradation and the like during molding.

Glass transition temperature of the polyamide of the present invention is preferably 50 to 110° C., more preferably 50 to 100° C. and most preferably 50 to 90° C. The glass transition temperature can be measured in accordance with JIS K7121. More specifically, it can be determined using, for example, DSC-7 equipment made by PERKIN-ELMER INC. as follows. A sample is first melted on "hotstage" (EP80 made by Mettler Inc.), followed by quenching and solidifying the molten sample in liquid nitrogen to prepare a measurement sample. The sample of 10 mg is heated within a range from 30 to 300° C. at a heating rate of 20° C./min to measure the glass transition point. When the glass transition temperature is not lower than 50° C., there is less tendency for lowering the heat and chemical resistance and less possibility of an increase in the water absorption capacity, whereas a glass transition temperature not higher than 110° C. tends to provide better appearance in molding.

In the present invention, a reinforced polyamide obtained by compounding inorganic fillers with the polyamide of the present invention also gives remarkable effects, which are the object of the present invention.

The inorganic filler for the reinforced polyamide of the present invention is not specifically limited, and preferable examples thereof include glass fiber, carbon fiber, wollastonite, talc, mica, kaolin, barium sulfate, calcium carbonate, apatite, sodium phosphate, fluorite, silicon nitride, potassium titanate, molybdenum disulfide and apatite. Among others, glass fiber, carbon fiber, wollastonite, talc, mica, kaolin, boron nitride, potassium titanate and apatite are preferably used from the viewpoint of physical properties, safety and cost.

Among the above-described glass fiber and carbon fiber, the fibers having a number average fiber diameter of 3 to 30 µm, a weight average fiber length of 100 to 750 µm and an aspect ratio (L/D), that is a ratio of weight average fiber length to average fiber diameter, of 10 to 100 are most preferably used from the viewpoint of giving the polyamide superior characteristics. Further, when wollastonite is used, it is most preferred to have a number average fiber diameter of 3 to 30 µm, a weight average fiber length of 10 to 500 µm and the above-described aspect ratio (L/D) of 3 to 100. Moreover, with regard to talc, mica, kaolin, silicon nitride and potassium titanate, those having a number average fiber diameter of 0.1 to 3 µm are most preferably used.

In particular, the above-described inorganic fillers of surface treated types are preferably used.

As a surface treatment agent, a coupling agent or a film-forming agent is used.

The coupling agent includes silane-based coupling agent and titanium-based coupling agent.

The silane-based coupling agent includes triethoxysilane, vinyltris(β-methoxyethoxy)silane, γ-methacryloxy-propyltrimethoxysilane, γ-glycidoxypropyltrimethoxy-silane, β-(1,1-epoxycyclohexyl)ethyltrimethoxysilane, N-β-(aminoethyl)-γ-aminopropylmethyldimethoxysilane, γ-amino-propyltriethoxysilane, N-phenyl-γ-aminopropyl-trimethoxy silane, γ-mercaptopropyltrimethoxysilane, γ-chloropropyltrimethoxysilane, γ-aminopropyltri-methoxysilane, γ-aminopropyl-tris(2-methoxy-ethoxy) silane, N-methyl-γ-aminopropyltrimethoxysilane, N-vinylbenzyl-γ-aminopropyltriethoxysilane, triaminopropyltrimethoxysilane, 3-ureidopropyl-trimethoxysilane, 3-(4,5-dihydroimidazole)propyl-triethoxysilane, hexamethyldisilazane, N,O-bis (trimethylsilyl)amide and N,N-bis(trimethylsilyl)urea. Among others, aminosilane and epoxysilane such as γ-aminopropyl-trimethoxysilane, N-β-(aminoethyl)-γ-aminopropyl-trimethoxysilane, γ-glycidoxypropyl-trimethoxysilane, β-(1,1-epoxycyclohexyl) ethyltrimethoxysilane and the like are preferably used due to economical advantage and easy handling.

The titanium-based coupling agent includes isopropyltrii-sostearoyl titanate, isopropyltridecylbenzeneslufonyl titanate, isopropyltris(dioctylpyrophosphate) titanate, tetraisopropylbis(dioctylphosphite) titanate, tetraoctylbis (ditridecylphosphite) titanate, tetra(1,1-diallyloxymethyl-1-butyl)bis(ditridecyl-phosphite)titanate, bis(dioctyl-pyrophophate)oxyacetate-titanate, bis(dioctylpyrophophate) ethylene titanate, isopropyltrioctanoyl titanate, isopropy-ldimethacrylisosteraoyl titanate, isopropylisostearoyldiacryl titanate, isopropyltri(dioctylphosphate) titanate, isopropyl-tricumylphenyl titanate, isopropyltri(N-amidoethyl-aminoethyl) titanate, dicumylphenyloxyacetate titanate and diisostearoyl-ethylene titanate and the like.

The film forming agent includes polymers such as urethane type polymers, acrylic acid-based polymers, copolymers of maleic anhydride and an unsaturated monomer such as ethylene, styrene, α-methylstyrene, butadiene, isoprene, chloroprene, 2,3-dichlorobutadiene, 1,3-pentadiene and cyclooctadiene, epoxy polymers, polyester polymers, vinyl acetate-based polymers and polyether polymers. Among others, in particular, urethane polymers, acrylic acid-based polymers and copolymers of maleic anhydride and butadiene, ethylene and styrene and mixtures thereof are preferably used from the viewpoints of economical advantage and superior performances.

The inorganic fillers may be surface treated using the above-described coupling agents and film forming agents by well known methods including sizing treatment in which a solution or a suspension of the above-described coupling agent and film forming agent in an organic solvent is surface-coated as a sizing agent, dry mixing method for coating the same using a Henschel mixer, super mixer, Laydy mixer or twin-cylinder mixer and spray method for spray coating the same as well as integral blend method and dry concentrate method. A combined method thereof may also be included, for example, coating of a coupling agent and a part of a film forming agent by sizing treatment followed by spraying the remainder of the film forming agent. Among them, in particular, sizing treatment, dry mixing, spraying method and a combined method thereof are preferably used from the viewpoint of economical advantage.

The method for producing the above-described reinforced polyamide is not specifically limited as long as it is a mixing method for the polyamide of the present invention and inorganic fillers. For example, the melt mixing temperature is preferably about 250 to 350° C. as a resin temperature and the melt mixing time is preferably about 1 to 30 minutes. Further, the feeding method for the components of the reinforced polyamide into a melt mixing equipment may be a simultaneous feed system of all components into the same feeding port or a method to feed each component from different feeding ports, respectively. More specifically, the mixing method includes, for example, a method for mixing the polyamide and inorganic fillers using a Henschel mixer and the like, followed by feeding them into a melt mixing equipment to complete kneading, or a method for com-pounding inorganic fillers from a side feeder into the polyamide in molten state in a single screw or a twin screw extruder.

As the melt mixing equipment, known equipment can be used. For example, single screw or twin screw extruder, Banbury mixer and mixing roll are preferably used.

The number average fiber diameter and weight average fiber length of the inorganic fillers can be determined by dissolving the molded article in a solvent for the polyamide such as formic acid, optionally selecting 100 or more fibers of inorganic fillers from the insoluble components, and examining them using an optical microscope or a scanning electron microscope.

The amount of inorganic fillers to be compounded is 5 to 500 parts by weight, preferably 10 to 250 parts by weight and more preferably 10 to 150 parts by weight based on 100 parts by weight of the polyamide. A compounding amount not less than 5 parts by weight provides sufficiently improved mechanical properties, while a compounding amount not higher than 500 parts by weight provides less lowering in moldability.

In the polyamide or the reinforced polyamide of the present invention, other resins may be mixed, if necessary, within a range that does not deteriorate the object of the present invention. Said other resin to be compounded is preferably a thermoplastic resin and a rubber component.

The above-described thermoplastic resin includes, for example, polystyrenic resins such as atactic polystyrene, isotactic polystyrene, syndiotactic polystyrene, AS resin and ABS resin; polyester resins such as poly(ethylene terephthalate) and poly(butylene terephthalate); polyamide such as nylon 6, 66, 612 and 66/6I; polyether resins such as polycarbonate, polyphenylene ether, polysulfone and polyethersulfone; condensation resins such as poly(phenylene sulfide) and polyoxymethylene; acrylic resins such as poly (acrylic acid), polyacrylate and poly(methyl methacrylate); polyolefinic resins such as polyethylene, polypropylene, polybutene and ethylene-propylene copolymer; halogen containing resins such as poly(vinyl chloride) and poly(vinylidene chloride); phenol resin; and epoxy resin.

The rubber component includes, for example, natural rubber, polybutadiene, polyisoprene, polyisobutylene, Neoprene, polysulfide rubber, thiokol rubber, acrylic rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), styrene-butadiene random copolymer, hydrogenated styrene-butadiene random copolymer, styrene-ethylene-propylene random copolymer, styrene-ethylene-butylene random copolymer, ethylene-propylene copolymer (EPR), ethylene-(1-butene)copolymer, ethylene-(1-hexene) copolymer, ethylene-(1-octene)copolymer and ethylene-propylenediene copolymer (EPDM); and core-shell type of rubber such as butadiene-acrylonitrile-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), alkyl acrylate-butadiene-acrylonitrile-styrene core-shell rubber (AABS), butadiene-styrene core-shell rubber (SBR) and siloxane containing rubber such as methyl methacrylate-butyl acrylatesiloxane.

Modified forms of the above-described other resins and rubber components are also preferably used. The modified form means the above-described other resin and rubber component is modified with a modifier having a polar group, and includes, for example, polypropylene modified with maleic anhydride, polyphenylene ether modified with maleic anhydride, polypropylene modified with maleic anhydride, SEBS modified with maleic anhydride, SEPS modified with maleic anhydride, ethylene-propylene copolymer modified with maleic anhydride, ethylene-(1-butene) copolymer modified with maleic anhydride, ethylene-(1-hexene) copolymer modified with maleic anhydride, ethylene-(1-octene) copolymer modified with maleic anhydride, EPDM modified with maleic anhydride, SEBS modified with epoxy group, ethylene-propylene copolymer modified with epoxy group, ethylene-(1-butene) copolymer modified with epoxy group, ethylene-(1-hexene) copolymer modified with epoxy group and ethylene-(1-octene) copolymer modified with epoxy group. These other resin and rubber component and modified forms thereof may be compounded alone or in combination of two or more types thereof.

Various additives used for usual polyamide resins can be added, if necessary, within a range not to impair the object of the present invention. The additives include, for example, flame retardant such as antimony trioxide, aluminum hydroxide, magnesium hydroxide, zinc borate, zinc stannate, zinc hydroxystannate, ammonium polyphosphate, cyanuric melamine, succinoguanamine, melamine polyphosphate, melamine sulfate, melamine phthalate, aromatic polyphosphates and composite glass powder; pigment or colorant such as titanium white and carbon black; phosphite-based stabilizer such as phosphite esters; heat stabilizer such as hindered phenol and hindered amine; heat resistance improving agent such as cuprous iodide and potassium iodide; moldability improving agent such as calcium stearate, calcium montanate, stearyl stearate and erucic acid amide; plasticizers; weather resistance improving agent; and antistatic agent.

Molded articles of the polyamide of the present invention or composition thereof can be obtained using commonly known plastic molding methods, such as compression molding, injection molding, gas assisted injection molding, welding, extrusion, blow molding, film forming, hollow molding, multi-layer molding and melt spinning.

The molded article of the present invention can also be used preferably as a molded body with a coated film on the surface thereof due to superior surface appearance. Any coating method can be suitably used without specific limitation as long as it is a known method. The method includes, for example, a spray method and electrostatic coating method. Further, any coating material can be suitably used without specific limitation as long as it is a known material, including coating materials such as melamine-curable polyester-polyol resin type and acryl-urethane type.

The molded articles of the polyamide of the present invention or compound thereof are superior in heat resistance, light resistance and weather resistance, as well as superior in toughness, low water absorption, chemical resistance and appearance. Therefore, it is expected to be suitably used in industrial machinery parts such as a gear and cam; electric/electronics parts such as a connector, switch, relay, MID, printed circuit board and housing for electronics parts; and extrusion applications such as a film, sheet, filament, tube, rod and blow molded articles. It is also expected to be suitably used as automotive parts such as interior parts/outer/panels/exterior parts, under-hood parts and electric equipment parts.

Hereinbelow, the present invention will be described in more detail using Examples, but it should not be construed to be limited by the following Examples as long as the gist of the present invention is maintained. Physical properties shown in the following Examples and Comparative Examples were evaluated as follows.

(1) Trans/Cis Molar Ratio of 1,4-cyclohexanedicarboxylic Acid

HPLC (high performance liquid chromatography) equipment (LC-10A made by Shimadzu Corp.) was used. 1,4-

Cyclohexanedicarboxylic acid monomer was separated into a trans component (elution time of about 11 minutes) and a cis component (elution time of about 14.5 minutes) by a gradient elution method using reversed-phase column, and thus said ratio was determined from a ratio of area of each peak. Detailed conditions of HPLC analysis are as follows:

| | |
|---|---|
| Equipment: | LC-10A vp made by Shimadzu Corp.; |
| Reversed-phase (C30) column: | Develosil PRAQUOUS made by Nomura Chemical Co. Ltd.; |
| Temperature: | 40° C.; |
| Flow rate: | 1.0 ml/min; |
| Detection: | UV 214 nm; |
| Mobile phase A: | Water [0.1% by weight of trifluoroacetic acid (TFA)]; |
| Mobile phase B: | Water/acetonitrile = 10/90 parts by weight, [0.1% by weight of trifluoroacetic acid (TFA)]; |
| Mixing ratio of mobile phases: | B = 0 → 100% (over 15 minutes); |
| Sample concentration: | 10 mg/ml, solvent: water/acetonitrile = 50/50); |
| Injection volume of sample solution: | 20 ml. |

(2) Characteristics of the Polyamide
(2-1) Number Average Molecular Weight (Mn) and Molecular Weight Distribution (Mw/Mn)

These characteristics were determined by gel permeation chromatography (GPC) using the polyamide or molded articles thereof under the following conditions.

| | |
|---|---|
| Equipment: | HLC-8020 made by TOSOH CORP.; |
| Detector: | Differential refractive index meter (RI); |
| Solvent: | Hexafluoroisopropanol dissolving 0.1% by mole of sodium trifluoroacetate; |
| Column: | Two TSKgel-GMHHR-H and one G1000HHR made by TOSOH CORP.; |
| Solvent flow rate: | 0.6 ml/min; |
| Sample concentration: | 1 to 3 (mg sample)/1 (ml solvent). |

Insoluble components were removed by filtration to prepare measurement samples. Number average molecular weight (Mn) and weight average molecular weight (Mw) were determined based on elution curve obtained by using polymethyl methacrylate as a standard sample. The value of (Mw/Mn) was calculate by dividing Mw by Mn.

(2-2) Specific Gravity (Kg/m$^3$)

Specific gravity of an injection molded test piece was measured using the specific gravity measuring equipment (SD-120L made by MIRAQE).

(2-3) Melting Point (° C.), Heat of Melting (J/g) and Crystallization Temperature (° C.)

These properties were measured in accordance with JIS K7121 and K7122 using Model DSC-7 made by PERKIN-ELMER INC. Measurement was conducted according to the following procedure: A sample of about 10 mg was heated at a heating rate of 20° C./min under nitrogen atmosphere to obtain an endothermic peak (melting peak), which was defined as Tm$^1$ (° C.). The sample was kept in a melt state at a temperature of Tm$^1$+40° C. for 2 minutes, then cooled down to 30° C. at a cooling rate of 20° C./min to obtain an exothermic peak (crystallization peak), which was defined as crystallization temperature. Subsequently, the sample was kept at 30° C. for 2 minutes, followed by heating at a heating rate of 20° C./min to obtain a peak (melting peak), which was defined as melting point Tm$^2$ (° C.). Heat of melting was determined from a peak area thereof.

(2-4) Glass Transition Temperature (° C.)

Glass transition temperature was measured in accordance with JIS K7121 using Model DSC-7 made by PERKIN-ELMER INC. A sample was first melted on a hot stage (EP80 made by Mettler Inc.), then the sample in molten state was quenched and solidified in liquid nitrogen to prepare a measurement sample. Glass transition temperature was measured by heating 10 mg of the sample in a range from 30 to 300° C. at a heating rate of 20° C./min.

(2-5) Water Absorption Ratio (% by Weight)

Water absorption ratio was determined by measuring weights before and after immersing a sample in water at 23° C. for 24 hours. More specifically, water absorption ratio was obtained by dividing a weight increase after the immersion by a weight of the sample in an absolute dry condition.

(3) Preparation of Molded Article and Physical Properties Thereof

Molded article was prepared using injection molding machine, PS40E made by Nissei Plastic Ind. Co., Ltd. Molded article was obtained under the following injection molding conditions: Mold temperature: 120° C.; injection time: 17 seconds; cooling time: 20 seconds. Cylinder temperature was set at a temperature of about 30° C. above the melting point of the polyamide determined in accordance with the above-described procedure (1-1).

(4) Mechanical Properties of the Polyamide
(4-1) Tensile Strength (MPa) and Tensile Elongation (%)

These properties were measured in accordance with ASTM D638.

(4-2) Flexural Modulus (GPa)

This property was measured in accordance with ASTM D790.

(4-3) Notched Izod Impact Strength (J/m)

This property was measured in accordance with ASTM D256.

(4-4) Heat Deflection Temperature (° C.)

This property was measured in accordance with ASTM D648 under a load of 1.86 MPa.

(4-5) Chemical Resistance

Chemical resistance was evaluated by measuring a depth of crack after a treatment with calcium chloride. More specifically, a dumbbell-shaped injection molded test piece (3 mm thick) was immersed in water at 80° C. for 8 hours, then weights were hung down at both ends thereof so that stress of 19.6 MPa was loaded at the support point (which was apart by 10 cm from the weight-hanging ends). Further, a gauze of 74 mm×74 mm was attached on the support area (after folded two times to a rectangular shape of 37 mm×18 mm), on which 1 ml of 30% by weight of calcium chloride aqueous solution was dropped. The test piece was placed in an oven (100° C.) for 2 hours, then a depth of the resulting crack on the test piece was measured.

(4-6) Light Resistance

Light resistance was evaluated by calculating retention (%) from tensile strengths before and after irradiation of UV light of a wavelength of 254 nm for 1 hour at a distance of 1 mm from the surface of dumbbell-shaped injection molded test piece for tensile strength measurement.

(4-7) Surface Appearance

Surface appearance was evaluated by measuring Gs 60° C. in accordance with JIS-K7150 using a handy gloss meter IG320 made by Horiba Ltd.

EXAMPLE 1

In 3,000 ml of distilled water, 500.4 g (2.906 mole) of 1,4-cyclohexanedicarboxylic acid having a trans/cis molar ratio of 80/20, 637.4 g (4.360 mole) of adipic acid and 844.3 g (7.266 mole) of hexamethylenediamine were dissolved to prepare an aqueous solution with a neutralization equivalent point of pH=7.80 at 60° C. The aqueous solution was charged in a 6L autoclave, which was purged with nitrogen. The solution was then concentrated, while stirred at 110 to 150° C., by gradually removing steam until the concentration of the solution reached 70% by weight. Then the temperature was raised to 218° C. and pressure was raised to 22 Kg/cm² in the autoclave. Reaction was continued for 1 additional hour until the temperature reached 253° C., while the pressure was maintained at 22 Kg/cm² by gradually removing steam to obtain a prepolymer with a number average molecular weight (Mn) of 5,000. This prepolymer was crushed to pieces having a size not larger than 3 mm and dried at 100° C. for 24 hours, under nitrogen gas stream at a flow rate of 20 L/min. Subsequently, the prepolymer was subjected to solid phase polymerization at 210° C. for 10 hours under nitrogen gas stream at a flow rate of 200 ml/min to obtain a polyamide. Results obtained are shown in Table 1.

EXAMPLE 2

A polyamide was polymerized and molded according to the same method as in Example 1 except that 1,4-cyclohexanedicarboxylic acid having a trans/cis molar ratio of 65/35 was used. Results obtained are shown in Table 1.

EXAMPLE 3

A polyamide was polymerized and molded according to the same method as in Example 1 except that 1,4-cyclohexanedicarboxylic acid having a trans/cis molar ratio of 55/45 was used. Results obtained are shown in Table 1.

EXAMPLE 4

A polyamide was polymerized and molded according to the same method as in Example 1 except that 1,4-cyclohexanedicarboxylic acid having a trans/cis molar ratio of 95/5 was used. Results obtained are shown in Table 1.

COMPARATIVE EXAMPLE 1

A polyamide was polymerized and molded according to the same method as in Example 1 except that 1,4-cyclohexanedicarboxylic acid having a trans/cis molar ratio of 20/80 was used. Results obtained are shown in Table 1.

COMPARATIVE EXAMPLE 2

A polyamide was polymerized and molded according to the same method as in Example 1 except that 1,4-cyclohexanedicarboxylic acid having a trans/cis molar ratio of 99.7/0.3 was used. Results obtained are shown in Table 1.

EXAMPLE 5

A polyamide was polymerized and molded according to the same method as in Example 1 except that 750.8 g (4.360 mole) of 1,4-cyclohexanedicarboxylic acid having a trans/cis molar ratio of 80/20, 424.9 g (2.906 mole) of adipic acid and 844.3 g (7.266 mole) of hexamethylenediamine were used. Results obtained are shown in Table 2.

EXAMPLE 6

A polyamide was polymerized and molded according to the same method as in Example 1 except that 187.7 g (1.090 mole) of 1,4-cyclohexanedicarboxylic acid having a trans/cis molar ratio of 80/20, 902.9 g (6.176 mole) of adipic acid and 844.3 g (7.266 mole) of hexamethylenediamine were used. Results obtained are shown in Table 2.

COMPARATIVE EXAMPLE 3

A polyamide was polymerized according to the same method as in Example 1 except that 1363.8 g (7.266 mole) of 1,4-cyclohexanedicarboxylic acid having a trans/cis molar ratio of 80/20 and 844.3 g (7.266 mole) of hexamethylenediamine were used. Melting point was measured in accordance with the method described in (2-3). $Tm^1$ was 412° C. but $Tm^2$ was not detected. The sample could not be molded because $Tm^1$ was over 400° C.

COMPARATIVE EXAMPLE 4

A polyamide was polymerized and molded according to the same method as in Example 1 except that 62.6 g (0.363 mole) of 1,4-cyclohexanedicarboxylic acid having a trans/cis molar ratio of 80/20, 1,009.1 g (6.903 mole) of adipic acid and 844.3 g (7.266 mole) of hexamethylenediamine were used. Results obtained are shown in Table 2.

EXAMPLE 7

In 3,000 ml of distilled water, 1,251.2 g (7.266 mole) of 1,4-cyclohexanedicarboxylic acid having a trans/cis molar ratio of 80/20 and 1,048.2 g (7.266 mole) of octamethylenediamine were dissolved to prepare an aqueous solution with a neutralization equivalent point of pH=7.80 at 60° C. The solution was charged in a 6L autoclave, which was purged with nitrogen. The solution was then concentrated, while being stirred at 110 to 150° C., by gradually removing steam until the concentration of the solution reached 70% by weight. Then the temperature was raised to 218° C. and pressure was raised to 22 Kg/cm² in the autoclave. The reaction was continued for 1 additional hour until the temperature reached 253° C., while the pressure was maintained at 22 Kg/cm² by gradually removing steam to obtain a prepolymer with a number average molecular weight (Mn) of 5,000. This prepolymer was crushed to pieces having a size not larger than 3 mm and dried at 100° C. for 24 hours, under nitrogen gas stream at a flow rate of 20 L/min. The dried prepolymer was extruded using a kneader type reaction extruder (BT-30 made by Plastic Engineering Institute Co. Ltd.) under the conditions of 300° C., reduced pressure of 0.03 MPa and residence time of 10 minutes to obtain a polyamide. Results obtained are shown in Table 3.

EXAMPLE 8

A polyamide was polymerized and molded according to the same method as in Example 7 except that 1,150.1 g (7.266 mol) of nonamethylenediamine was used instead of octamethylenediamine in Example 7. Results obtained are shown in Table 3.

EXAMPLE 9

A polyamide was polymerized and molded according to the same method as in Example 7 except that 1,455.9 g (7.266 mol) of dodecamethylenediamine was used instead of octamethylenediamine in Example 7. Results obtained are shown in Table 3.

EXAMPLE 10

In 3,000 ml of distilled water, 250.2 g (1.453 mole) of 1,4-cyclohexanedicarboxylic acid which has a trans/cis molar ratio of 80/20, 849.8 g (5.813 mole) of adipic acid and 1,354.4 g (7.266 mole) of undecamethylenediamine were dissolved at 60° C. to prepare an aqueous solution. A polyamide was polymerized and molded using this aqueous solution according to the same method as in Example 7. Results obtained are shown in Table 3.

COMPARATIVE EXAMPLE 5

A polyamide was polymerized and molded according to the same method as in Example 7 except that 1,363.8 g (7.266 mole) of 1,4-cyclohexanedicarboxylic acid having a trans/cis molar ratio of 20/80 was used. Results obtained are shown in Table 4.

COMPARATIVE EXAMPLE 6

In 2,688 ml of distilled water, 1,251.2 g (7.266 mole) of 1,4-cyclohexanedicarboxylic acid having a trans/cis molar ratio of 50/50 and 1,354.4 g (7.266 mole) of undecamethylenediamine were dissolved at 60° C. to prepare an aqueous solution. A polyamide was polymerized and molded according to the same method as in Example 7 except that this aqueous solution was used. Results obtained are shown in Table 4.

COMPARATIVE EXAMPLE 7

In 2,688 ml of distilled water, 1,063.5 g (6.176 mole) of 1,4-cyclohexanedicarboxylic acid having a trans/cis molar ratio of 20/80, 159.3 g (1.090 mole) of adipic acid and 1,354.4 g (7.266 mole) of undecamethylenediamine were dissolved at 60° C. to prepare an aqueous solution. A polyamide was polymerized and molded according to the same method as in Example 7 except that this aqueous solution was used. Results obtained are shown in Table 4.

EXAMPLE 11

In 2,731 ml of distilled water, 132.4 g (0.769 mole) of 1,4-cyclohexanedicarboxylic acid having a trans/cis molar ratio of 80/20, 1,206.3 g (8.254 mole) of adipic acid, 132.4 g (0.797 mole) of isophthalic acid and 1,141.1 g (9.820 mole) of hexamethylenediamine were dissolved to prepare an aqueous solution with a neutralization equivalent point of pH=7.56 at 60° C. The aqueous solution was charged in a 6L autoclave, which was purged with nitrogen. The solution was then concentrated, while being stirred at 110 to 150° C., by gradually removing steam until the concentration of the solution reached 70% by weight. Then the temperature was raised to 218° C. and pressure was raised to 18 Kg/cm² in the autoclave. The reaction was continued for 1 additional hour until the temperature reached 253° C., while the pressure was maintained at 18 Kg/cm² by gradually removing steam. Then the pressure was lowered to 1 Kg/cm² over 1 hour and the polymerization was continued for 15 additional minutes while nitrogen gas was made to flow in the autoclave to obtain a polyamide. This polyamide was crushed to pieces having a size not larger than 2 mm, and dried at 100° C. for 12 hours under the nitrogen atmosphere. Results obtained are shown in Table 4.

EXAMPLE 12

A polyamide was polymerized and molded according to the same method as in Example 11 except that 1,4-cyclohexanedicarboxylic acid having a trans/cis molar ratio of 60/40 was used. Results obtained are shown in Table 5.

EXAMPLE 13

In 2,688 ml of distilled water, 220.7 g (1.282 mole) of 1,4-cyclohexanedicarboxylic acid having a trans/cis molar ratio of 80/20, 1.029.9 g (7.047 mole) of adipic acid, 220.7 g (1.328 mole) of isophthalic acid and 1,122.1 g (9.657 mole) of hexamethylenediamine were dissolved to prepare an aqueous solution with a neutralization equivalent point of pH=7.56 at 60° C. A polyamide was polymerized and molded according to the same method as in Example 11 except that this aqueous solution was used. Results obtained are shown in Table 5.

EXAMPLE 14

In 2,688 ml of distilled water, 498.9 g (2.897 mole) of 1,4-cyclohexanedicarboxylic acid having a trans/cis molar ratio of 80/20, 564.6 g (3.863 mole) of adipic acid, 481.5 g (2.897 mole) of isophthalic acid and 1,122.1 g (9.657 mole) of hexamethylenediamine were dissolved to prepare an aqueous solution with a neutralization equivalent point of pH=7.56 at 60° C. A polyamide was polymerized and molded according to the same method as in Example 11 except that this aqueous solution was used. Results obtained are shown in Table 5.

COMPARATIVE EXAMPLE 8

A polyamide was polymerized and molded according to the same method as in Example 11 except that 1,4-cyclohexanedicarboxylic acid having a trans/cis molar ratio of 99.7/0.3 was used. Results obtained are shown in Table 6.

COMPARATIVE EXAMPLE 9

A polyamide was polymerized and molded according to the same method as in Example 11 except that 1,4-cyclohexanedicarboxylic acid having a trans/cis molar ratio of 45/55 was used. Results obtained are shown in Table 6.

COMPARATIVE EXAMPLE 10

In 2,800 ml of distilled water, 132.4 g (0.797 mole) of terephthalic acid, 1,206.3 g (8.254 mole) of adipic acid, 132.4 g (0.797 mole) of isophthalic acid and 1,144.4 g (9.848 mole) of hexamethylenediamine were dissolved to prepare an aqueous solution with a neutralization equivalent point of pH=7.17 at 60° C. A polyamide was polymerized and molded according to the same method as in Example 11 except that this aqueous solution was used. Results obtained are shown in Table 6.

COMPARATIVE EXAMPLE 11

In 2,616 ml of distilled water, 1,206.3 g (8.254 mole) of adipic acid, 264.8 g (1.594 mole) of isophthalic acid and 1,144.4 g (9.848 mole) of hexamethylenediamine were dissolved to prepare an aqueous solution with a neutralization equivalent point of pH=7.15 at 60° C. A polyamide was polymerized and molded according to the same method as in Example 11 except that this aqueous solution was used. Results obtained are shown in Table 6.

EXAMPLE 15

Using 100 parts by weight of the polyamide obtained in Example 1 and 40 parts by weight of glass fiber with a diameter of 10 μm and an average length of 3 mm (ECS03T275 GH made by Nippon Electric Glass Co., Ltd.), dry blend was carried out. This blend was melt mixed and pelletized using a co-rotating twin screw extruder TEM35 (L1/D1=47) made by Toshiba Machine Co., Ltd., under conditions of cylinder temperature=320° C. and revolution speed=400 rpm to produce a polyamide composition. Results obtained are shown in Table 7.

EXAMPLE 16

A composition was prepared by compounding glass fiber into a polyamide according to the same method as in Example 14 except that the polyamide obtained in Example 11 was used, then injection molding of the composition was carried out. Results obtained are shown in Table 7.

EXAMPLE 17

Using 100 parts by weight of the polyamide obtained in Example 1, 30 parts by weight of glass fiber with a diameter of 10 μm and an average length of 3 mm (ECS03T275 GH made by Nippon Electric Glass Co., Ltd.) and 10 parts by weight of wollastonite (NYGLOS5: surface treated type with a diaminosilane coupling agent, having an average fiber diameter of 5 μm and an average fiber length of 65 μm made by Tomoe Engineering Co., Ltd.), dry blend was carried out. This blend was melt mixed and pelletized using a co-rotating twin screw extruder TEM35 (L1/D1=47) made by Toshiba Machine Co., Ltd., under conditions of cylinder temperature=320° C. and revolution speed=400 rpm to produce a polyamide composition. Results obtained are shown in Table 7.

EXAMPLE 18

Using 100 parts by weight of the polyamide obtained in Example 1, 30 parts by weight of glass fiber with a diameter of 10 μm and an average length of 3 mm (ECS03T275 GH made by Nippon Electric Glass Co., Ltd.) and 10 parts by weight of mica (A-11 with an average particle size of 3 μm supplied by TSUCHIYA KAOLIN IND. LTD.), dry blend was carried out. This blend was melt mixed and pelletized using a co-rotating twin screw extruder TEM35 (L1/D1=47) made by Toshiba Machine Co., Ltd., under conditions of cylinder temperature=320 to 350° C. and revolution speed= 400 rpm to produce a polyamide composition. Results obtained are shown in Table 7.

COMPARATIVE EXAMPLE 12

A composition was prepared by compounding glass fiber into a polyamide according to the same method as in Example 14 except that the polyamide obtained in Comparative Example 1 was used, then injection molding of the composition was carried out. Results obtained are shown in Table 7.

TABLE 1

|  | Example 1 | Example 2 | Example 3 | Example 4 | Comparative Example 1 | Comparative Example 2 |
|---|---|---|---|---|---|---|
| Characteristics of Monomer | | | | | | |
| Dicarboxylic Acid Component (% by mole) | ADA/CHDC (60/40) | ADA/CHDC (60/40) | ADA/CHDC (60/40) | ADA/CHDC (60/40) | ADA/CHDC (60/40) | ADA/CHDC (60/40) |
| Trans/Cis Molar Ratio of CHDA | 80/20 | 65/35 | 55/45 | 95/5 | 20/80 | 99.7/0.3 |
| Diamine Component (% by mole) | C6DA (100) | C6DA (100) | C6DA (100) | C6DA (100) | C6DA (100) | C6DA (100) |
| Characteristics of Polymer | | | | | | |
| Melting Point: $Tm^2$ (° C.) | 290 | 290 | 289 | 291 | 288 | 293 |
| Melting Enthalpy (J/g) | 25 | 25 | 25 | 25 | 24 | 26 |
| Crystallization Temperature (° C.) | 248 | 248 | 248 | 250 | 246 | 255 |
| Glass Transition Temperature (° C.) | 70 | 70 | 70 | 72 | 68 | 75 |
| Number Average Molecular Weight (Mn) | 15,500 | 15,500 | 15,000 | 15,000 | 15,000 | 14,500 |
| Molecular Weight Distribution (Mw/Mn) | 2.9 | 2.9 | 2.9 | 3.0 | 3.0 | 3.2 |
| Specific Gravity ($Kg/m^3$) | 1.12 | 1.12 | 1.12 | 1.12 | 1.12 | 1.12 |
| Mechanical Properties of Polymer | | | | | | |
| Tensile Strength (MPa) | 85 | 85 | 85 | 85 | 78 | 85 |
| Tensile Elongation (%) | 20 | 18 | 16 | 20 | 7 | 20 |
| Flexural Modulus (Gpa) | 2.9 | 2.9 | 2.9 | 2.9 | 2.8 | 2.9 |
| Notched Izod Impact Strength (J/m) | 55 | 55 | 50 | 55 | 47 | 55 |
| Heat Deflection Temperature (° C.) | 100 | 100 | 98 | 100 | 97 | 100 |
| Water Absorption Ratio (% by weight) | 0.80 | 0.75 | 0.75 | 0.85 | 0.75 | 0.95 |
| Retension of Strength after UV Irradiation (%) | >95 | >95 | >95 | >95 | >95 | >95 |
| Depth of Crack after $CaCl_2$ Treatment (μm) | 0.5 | 0.5 | 0.6 | 0.5 | 2.7 | 0.5 |
| Appearance (Gloss at 60° C.) | 75 | 75 | 75 | 70 | 77 | 50 |

ADA: Adipic Acid, CHDC: 1,4-Cyclohexanedicarboxylic acid, C6DA: Hexamethylenediamine

TABLE 2

| | Example 5 | Example 6 | Comparative Example 3 | Comparative Example 4 |
|---|---|---|---|---|
| Characteristics of Monomer | | | | |
| Dicarboxylic Acid Component (% by mole) | ADA/CHDC (40/60) | ADA/CHDC (85/15) | CHDC (100) | ADA/CHDC (95/5) |
| Trans/Cis Molar Ratio of CHDA | 80/20 | 80/20 | 80/20 | 80/20 |
| Diamine Component (% by mole) | C6DA (100) | C6DA (100) | C6DA (100) | C6DA (100) |
| Characteristics of Polymer | | | | |
| Melting Point: $Tm^2$ (° C.) | 327 | 283 | (Tm1 = 412) | 270 |
| Melting Enthalpy (J/g) | 11 | 46 | ND* | 50 |
| Crystallization Temperature (° C.) | 289 | 241 | ND+ | 225 |
| Glass Transition Temperature (° C.) | 90 | 55 | ND+ | 50 |
| Number Average Molecular Weight (Mn) | 15,000 | 14,500 | 13,000 | 16,500 |
| Molecular Weight Distribution (Mw/Mn) | 3.0 | 3.0 | 3.0 | 3.0 |
| Specific Gravity (Kg/m³) | 1.12 | 1.13 | 1.11 | 1.14 |
| Mechanical Properties of Polymer | | | | |
| Tensile Strength (MPa) | 82 | 85 | not moldable | 82 |
| Tensile Elongation (%) | 11 | 25 | | 25 |
| Flexural Modulus (Gpa) | 2.8 | 2.9 | | 2.8 |
| Notched Izod Impact Strength (J/m) | 47 | 55 | | 55 |
| Heat Deflection Temperature (° C.) | 120 | 87 | not moldable | 79 |
| Water Absorption Ratio (% by weight) | 0.83 | 0.95 | | 1.23 |
| Retension of Strength after UV Irradiation (%) | >95 | >95 | | >95 |
| Depth of Crack after CaCl₂ Treatment (μm) | no crack | 1.8 | | >5 |
| Appearance (Gloss at 60° C.) | 70 | 75 | | 77 |

ADA: Adipic Acid, CHDC: 1,4-Cyclohexanedicarboxylic acid, C6DA: Hexamethylenediamine
ND*: Not detected.

TABLE 3

| | Example 7 | Example 8 | Example 9 | Example 10 |
|---|---|---|---|---|
| Characteristics of Monomer | | | | |
| Dicarboxylic Acid Component (% by mole) | CHDC (100) | CHDC (100) | CHDC (100) | CHDC/ADA (20/80) |
| Trans/Cis Molar Ratio of CHDA | 80/20 | 80/20 | 80/20 | 80/20 |
| Diamine Component (% by mole) | C8DA (100) | C9DA (100) | C12DA (100) | C11DA (100) |
| Characteristics of Polymer | | | | |
| Melting Point: $Tm^2$ (° C.) | 325 | 313 | 285 | 262 |
| Melting Enthalpy (J/g) | 11 | 18 | 25 | 22 |
| Crystallization Temperature (° C.) | 276 | 271 | 232 | 215 |
| Glass Transition Temperature (° C.) | 86 | 76 | 57 | 52 |
| Number Average Molecular Weight (Mn) | 15,500 | 15,500 | 15,000 | 15,000 |
| Molecular Weight Distribution (Mw/Mn) | 3.5 | 3.5 | 3.6 | 3.4 |
| Specific Gravity (Kg/m³) | 1.09 | 1.09 | 1.09 | 1.11 |
| Mechanical Properties of Polymer | | | | |
| Tensile Strength (MPa) | 85 | 85 | 85 | 85 |
| Tensile Elongation (%) | 12 | 18 | 25 | 22 |
| Flexural Modulus (Gpa) | 2.8 | 2.8 | 2.8 | 2.8 |
| Notched Izod Impact Strength (J/m) | 45 | 55 | 55 | 55 |
| Heat Deflection Temperature (° C.) | 113 | 98 | 81 | 75 |
| Water Absorption Ratio (% by weight) | 0.53 | 0.52 | 0.50 | 0.65 |
| Retension of Strength after UV Irradiation (%) | >95 | >95 | >95 | >95 |
| Depth of Crack after CaCl₂ Treatment (μm) | no crack | no crack | no crack | no crack |
| Appearance (Gloss at 60° C.) | 70 | 77 | 77 | 77 |

CHDC: 1,4-Cyclohexanedicarboxylic acid, C8DA: Octamethylenediamine, C9DA: Nonanemethylenediamine, C12DA: Dodecamethylenediamine, C11DA: Undecamethylenediamine

TABLE 4

| | Comparative Example 5 | Comparative Example 6 | Comparative Example 7 |
|---|---|---|---|
| Characteristics of Monomer | | | |
| Dicarboxylic Acid Component (% by mole) | CHDC (100) | CHDC (100) | ADA/CHDC (15/85) |
| Trans/Cis Molar Ratio of CHDA | 20/80 | 50/50 | 20/80 |
| Diamine Component (% by mole) | C8DA (100) | C11DA (100) | C11DA (100) |
| Characteristics of Polymer | | | |
| Melting Point: $Tm^2$ (° C.) | 323 | 282 | 267 |
| Melting Enthalpy (J/g) | 10 | 22 | 25 |
| Crystallization Temperature (° C.) | 275 | 239 | 225 |
| Glass Transition Temperature (° C.) | 85 | 75 | 55 |
| Number Average Molecular Weight (Mn) | 15,000 | 14,500 | 14,500 |
| Molecular Weight Distribution (Mw/Mn) | 3.5 | 3.7 | 3.5 |
| Specific Gravity (Kg/m³) | 1.09 | 1.09 | 1.09 |

TABLE 4-continued

|  | Comparative Example 5 | Comparative Example 6 | Comparative Example 7 |
|---|---|---|---|
| Mechanical Properties of Polymer | | | |
| Tensile Strength (MPa) | 75 | 85 | 85 |
| Tensile Elongation (%) | 5 | 8 | 11 |
| Flexural Modulus (Gpa) | 2.8 | 2.8 | 2.8 |
| Notched Izod Impact Strength (J/m) | 35 | 40 | 50 |
| Heat Deflection Temperature (° C.) | 110 | 100 | 78 |
| Water Absorption Ratio (% by weight) | 0.55 | 0.5 | 0.5 |
| Retention of Strength after UV Irradiation (%) | >95 | >95 | >95 |
| Depth of Crack after CaCl$_2$ Treatment (μm) | no crack | no crack | no crack |
| Appearance (Gloss at 60° C.) | 70 | 45 | 60 |

CHDC: 1,4-Cyclohexanedicarboxylic acid, C11DA: Undecamethylenediamine

TABLE 5

|  | Example 11 | Example 12 | Example 13 | Example 14 |
|---|---|---|---|---|
| Characteristics of Monomer | | | | |
| Dicarboxylic Acid Component (% by mole) | ADA/CHDC/IPA (84/8/8) | ADA/CHDC/IPA (84/8/8) | ADA/CHDC/IPA (73/13/14) | ADA/CHDC/IPA (40/30/30) |
| Trans/Cis Molar Ratio of CHDA | 80/20 | 60/40 | 80/20 | 80/20 |
| Diamine Component (% by mole) | C6DA (100) | C6DA (100) | C6DA (100) | C6DA (100) |
| Characteristics of Polymer | | | | |
| Melting Point: Tm$^2$ (° C.) | 257 | 257 | 250 | 242 |
| Melting Enthalpy (J/g) | 36 | 36 | 28 | 22 |
| Crystallization Temperature (° C.) | 217 | 217 | 212 | 199 |
| Glass Transition Temperature (° C.) | 55 | 55 | 53 | 83 |
| Number Average Molecular Weight (Mn) | 15,500 | 15,500 | 15,000 | 13,500 |
| Molecular Weight Distribution (Mw/Mn) | 2.7 | 2.7 | 2.9 | 3.2 |
| Specific Gravity (Kg/m$^3$) | 1.13 | 1.13 | 1.12 | 1.11 |
| Mechanical Properties of Polymer | | | | |
| Tensile Strength (MPa) | 85 | 85 | 86 | 85 |
| Tensile Elongation (%) | 22 | 20 | 20 | 15 |
| Flexural Modulus (Gpa) | 2.9 | 2.9 | 2.8 | 2.9 |
| Notched Izod Impact Strength (J/m) | 58 | 58 | 60 | 50 |
| Heat Deflection Temperature (° C.) | 75 | 75 | 75 | 98 |
| Water Absorption Ratio (% by weight) | 0.98 | 0.95 | 0.88 | 0.58 |
| Retention of Strength after UV Irradiation (%) | >95 | >95 | >95 | >95 |
| Depth of Crack after CaCl$_2$ Treatment (μm) | 0.5 | 1.0 | 0.1 | no crack |
| Appearance (Gloss at 60° C.) | 80 | 80 | 80 | 75 |

ADA: Adipic Acid, CHDC: 1,4-Cyclohexanedicarboxylic acid, C6DA: Hexamethylenediamine, IPA: Isophthalic Acid

TABLE 6

|  | Comparative Example 8 | Comparative Example 9 | Comparative Example 10 | Comparative Example 11 |
|---|---|---|---|---|
| Characteristics of Monomer | | | | |
| Dicarboxylic Acid Component (% by mole) | ADA/CHDC/IPA (84/8/8) | ADA/CHDC/IPA (84/8/8) | ADA/TPA/IPA (84/8/8) | ADA/IPA (82/18) |
| Trans/Cis Molar Ratio of CHDA | 99.7/0.3 | 45/55 | — | — |
| Diamine Component (% by mole) | C6DA (100) | C6DA (100) | C6DA (100) | C6DA (100) |
| Characteristics of Polymer | | | | |
| Melting Point: Tm$^2$ (° C.) | 260 | 255 | 249 | 240 |
| Melting Enthalpy (J/g) | 38 | 36 | 44 | 34 |
| Crystallization Temperature (° C.) | 220 | 215 | 211 | 192 |
| Glass Transition Temperature (° C.) | 60 | 53 | 50 | 60 |
| Number Average Molecular Weight (Mn) | 15,500 | 15,500 | 15,000 | 15,000 |
| Molecular Weight Distribution (Mw/Mn) | 2.7 | 2.7 | 3.1 | 2.9 |
| Specific Gravity (Kg/m$^3$) | 1.13 | 1.13 | 1.14 | 1.14 |
| Mechanical Properties of Polymer | | | | |
| Tensile Strength (MPa) | 85 | 75 | 83 | 86 |
| Tensile Elongation (%) | 22 | 7 | 25 | 10 |
| Flexural Modulus (Gpa) | 2.9 | 2.9 | 2.9 | 2.9 |
| Notched Izod Impact Strength (J/m) | 58 | 45 | 60 | 5.1 |
| Heat Deflection Temperature (° C.) | 78 | 75 | 75 | 75 |
| Water Absorption Ratio (% by weight) | 1.12 | 1.00 | 0.88 | 1.03 |
| Retention of Strength after UV Irradiation (%) | >95 | >95 | 80 | 90 |
| Depth of Crack after CaCl$_2$ Treatment (μm) | 0.5 | 2.0 | 0.1 | 2.2 |
| Appearance (Gloss at 60° C.) | 65 | 80 | 70 | 80 |

ADA: Adipic Acid, CHDC: 1,4-Cyclohexanedicarboxylic acid, C6DA: Hexamethylenediamine, IPA: Isophthalic Acid, TPA: Terephthalic Acid

TABLE 7

|  | Example 15 | Example 16 | Example 17 | Example 18 | Comparative Example 12 |
|---|---|---|---|---|---|
| Characteristics of Monomer |  |  |  |  |  |
| Dicarboxylic Acid Component (% by mole) | ADA/CHDC (60/40) | ADA/CHDC/IPA (84/8/8) | ADA/CHDC (60/40) | ADA/CHDC (60/40) | ADA/CHDC (60/40) |
| Trans/Cis Molar Ratio of CHDA | 80/20 | 80/20 | 80/20 | 80/20 | 20/80 |
| Diamine Component (% by mole) | C6DA (100) | C6DA (100) | C6DA (100) | C6DA (100) | C6DA (100) |
| Characteristics of Polymer |  |  |  |  |  |
| Melting Point: $Tm^2$ (° C.) | 290 | 257 | 290 | 290 | 288 |
| Melting Enthalpy (J/g) | 25 | 36 | 25 | 25 | 24 |
| Crystallization Temperature (° C.) | 248 | 217 | 248 | 248 | 246 |
| Glass Transition Temperature (° C.) | 70 | 55 | 70 | 70 | 68 |
| Number Average Molecular Weight (Mn) | 15,500 | 15,500 | 15,500 | 15,500 | 15,000 |
| Molecular Weight Distribution (Mw/Mn) | 2.9 | 2.7 | 2.9 | 2.9 | 3.0 |
| Specific Gravity ($Kg/m^3$) | 1.12 | 1.13 | 1.12 | 1.12 | 1.12 |
| Inorganic filler and its compounding ratio (parts by wt. based on 100 parts by wt. of polyamide) | GF* 40 | GF* 40 | GF*/Wollastonite 30/10 | GF*/Mica 30/10 | GF* 40 |
| Mechanical Properties of Polymer |  |  |  |  |  |
| Tensile Strength (MPa) | 210 | 200 | 190 | 190 | 175 |
| Tensile Elongation (%) | 7.5 | 7.5 | 5.5 | 5.5 | 4 |
| Flexural Modulus (Gpa) | 12 | 12 | 11 | 11 | 12 |
| Notched Izod Impact Strength (J/m) | 110 | 110 | 90 | 90 | 100 |
| Heat Deflection Temperature (° C.) | 275 | 240 | 275 | 275 | 275 |
| Water Absorption Ratio (% by weight) | 0.25 | 0.35 | 0.15 | 0.13 | 0.25 |
| Retension of Strength after UV Irradiation (%) | >95 | >95 | >95 | >95 | >95 |
| Depth of Crack after $CaCl_2$ Treatment ($\mu$m) | no crack | no crack | no crack | no crack | 0.1 |
| Appearance (Gloss at 60° C.) | 63 | 70 | 60 | 60 | 63 |

ADA: Adipic Acid, CHDC: 1,4-Cyclohexanedicarboxylic acid, C6DA: Hexamethylenediamine, GF*: glass fiber

INDUSTRIAL APPLICABILITY

The polyamide of the present invention is a polymer having well balanced physical properties and superior characteristics such as toughness, impact properties, heat resistance, light resistance, light weight, low water absorption, chemical resistance and appearance as well as an extremely superior moldability, and can be suitably used as a molding material for automotive parts, electric/electronics parts, industrial materials, engineering materials, daily household goods and the like.

What is claimed is:

1. A polyamide obtained by thermal polycondensation of (a) dicarboxylic acid components comprising 10 to 80% by mole based on the total moles of carboxylic acid components of 1,4-cyclohexanedicarboxylic acid having a trans/cis molar ratio of 55/45 to 97/3 and (b) an aliphatic diamine component.

2. The polyamide in accordance with claim 1, wherein said trans/cis molar ratio of 1,4-cyclohexanedicarboxylic acid is 55/45 to 90/10.

3. The polyamide in accordance with claim 1, wherein said trans/cis molar ratio of 1,4-cyclohexanedicarboxylic acid is 70/30 to 30/10.

4. The polyamide in accordance with claim 2, wherein the dicarboxylic acid component other than 1,4-cyclohexanedicarboxylic acid is an aliphatic dicarboxylic acid having 6 to 12 carbon atoms and/or an aromatic dicarboxylic acid and the aliphatic diamine component is an aliphatic diamine unit having 4 to 12 carbon atoms.

5. The polyamide in accordance with claim 3, wherein the dicarboxylic acid component other than 1,4-cyclohexanedicarboxylic acid is an aliphatic dicarboxylic acid having 6 to 12 carbon atoms and/or an aromatic dicarboxylic acid and the aliphatic diamine component is an aliphatic diamine unit having 4 to 12 carbon atoms.

6. The polyamide in accordance with claim 3, wherein the dicarboxylic acid component other than 1,4-cyclohexanedicarboxylic acid is adipic acid and/or isophthalic acid and the aliphatic diamine component is hexamethylenediamine.

7. The polyamide in accordance with claim 6, wherein the dicarboxylic acid component other than 1,4-cyclohexanedicarboxylic acid is adipic acid and/or isophthalic acid and the aliphatic diamine component is hexamethylenediamine.

8. The polyamide in accordance with claim 6, wherein the dicarboxylic acid components are composed of 10 to 60% by mole of 1,4-cyclohexanedicarboxylic acid having a trans/cis molar ratio of 70/30 to 90/10, 20 to 90% by mole of adipic acid and 0 to 40% by mole of isophthalic acid, based on the total moles of 1,4-cyclohexanedicarboxylic acid, adipic acid and isophthalic acid as being 100%.

9. The polyamide in accordance with claim 7, wherein the dicarboxylic acid components are composed of 10 to 60% by mole of 1,4-cyclohexanedicarboxylic acid having a trans/cis molar ratio of 70/30 to 90/10, 20 to 90% by mole of adipic acid and 0 to 40% by mole of isophthalic acid, based on the total moles of 1,4-cyclohexanedicarboxylic acid, adipic acid and isophthalic acid as being 100%.

10. The polyamide in accordance with claim 1, wherein said polyamide has a number average molecular weight (Mn) of 7,000 to 100,000 and a melting point of 210 to 340° C.

11. The polyamide in accordance with claim 3, wherein said polyamide has a number average molecular weight (Mn) of 7,000 to 100,000 and a melting point of 210 to 340° C.

12. The polyamide in accordance with claim 6, wherein said polyamide has a number average molecular weight (Mn) of 7,000 to 100,000 and a melting point of 210 to 340° C.

13. The polyamide in accordance with claim 7, wherein said polyamide has a number average molecular weight (Mn) of 7,000 to 100,000 and a melting point of 210 to 340° C.

14. The polyamide in accordance with claim 9, wherein said polyamide has a number average molecular weight (Mn) of 7,000 to 100,000 and a melting point of 210 to 340° C.

15. A molded article comprising the polyamide in accordance with claim 1.

16. A molded article comprising the polyamide in accordance with claim 7.

17. A molded article comprising the polyamide in accordance with claim 9.

18. A molded article comprising the polyamide in accordance with claim 14.

* * * * *